United States Patent
Oswald et al.

(10) Patent No.: US 11,352,461 B2
(45) Date of Patent: Jun. 7, 2022

(54) POLYURETHANE FOAM SYSTEM

(71) Applicant: Dow Global Technologies LLC, Midland, MI (US)

(72) Inventors: Katja Oswald, Schindellegi (CH); Adrian J. Birch, Kempraten-Jona (CH); Stefano Carlo E Grassini, Schindellegi (CH)

(73) Assignee: Dow Global Technologies LLC, Midland, MI (US)

( * ) Notice: Subject to any disclaimer, the term of this patent is extended or adjusted under 35 U.S.C. 154(b) by 87 days.

(21) Appl. No.: 16/647,660

(22) PCT Filed: Oct. 17, 2018

(86) PCT No.: PCT/US2018/056265
§ 371 (c)(1),
(2) Date: Mar. 16, 2020

(87) PCT Pub. No.: WO2019/094158
PCT Pub. Date: May 16, 2019

(65) Prior Publication Data
US 2020/0277429 A1 Sep. 3, 2020

Related U.S. Application Data

(60) Provisional application No. 62/584,164, filed on Nov. 10, 2017.

(51) Int. Cl.
| | | |
|---|---|---|
| *C08G 18/08* | (2006.01) | |
| *C08G 18/18* | (2006.01) | |
| *C08G 18/28* | (2006.01) | |
| *C08G 18/30* | (2006.01) | |
| *C08G 18/48* | (2006.01) | |

(52) U.S. Cl.
CPC ......... *C08G 18/14* (2013.01); *C08G 18/1833* (2013.01); *C08G 18/2865* (2013.01); *C08G 18/302* (2013.01); *C08G 18/485* (2013.01); *C08G 2110/005* (2021.01); *C08G 2110/0008* (2021.01); *C08G 2350/00* (2013.01)

(58) Field of Classification Search
CPC .................. C08G 18/14; C08G 18/1825; C08G 18/1833; C08G 18/2865; C08G 18/302; C08G 18/4812; C08G 18/482; C08G 18/485; C08G 18/5021; C08G 18/7664; C08G 2110/0008; C08G 2110/005; C08G 2350/00; C08J 9/0042; C08J 9/08
See application file for complete search history.

(56) References Cited

U.S. PATENT DOCUMENTS

| | | |
|---|---|---|
| 5,096,933 A | 3/1992 | Volkert |
| 5,523,332 A | 6/1996 | Fishback et al. |
| 5,523,333 A | 6/1996 | Fishback et al. |
| 5,523,334 A | 6/1996 | White, III et al. |
| 6,762,274 B2 | 7/2004 | Waddington et al. |
| 6,924,321 B2 | 8/2005 | Casati et al. |
| 7,361,695 B2 | 4/2008 | Tu et al. |
| 8,372,893 B2 | 2/2013 | Lekovic et al. |
| 8,957,123 B2 | 2/2015 | Lazraq et al. |
| 9,644,066 B2 | 5/2017 | Latham et al. |
| 2008/0125507 A1 | 5/2008 | Jenny et al. |
| 2009/0227695 A1* | 9/2009 | Burdeniuc ............... C08L 71/02 521/113 |
| 2013/0131276 A1* | 5/2013 | Burdeniuc ......... C08G 18/4072 525/259 |
| 2015/0099816 A1 | 4/2015 | Peters |
| 2018/0346773 A1* | 12/2018 | De Vries ................ C08G 18/10 |

FOREIGN PATENT DOCUMENTS

| | | |
|---|---|---|
| CA | 2139631 C | 12/2003 |
| CN | 1249115 C | 4/2006 |
| CN | 101392045 A | 3/2009 |
| CN | 104861150 | 8/2015 |
| EP | 421269 A2 | 4/1991 |
| EP | 617068 A2 | 9/1994 |
| EP | 708127 A2 | 4/1996 |
| EP | 1380608 | 1/2004 |
| EP | 2039713 B1 | 3/2014 |
| EP | 1924619 B1 | 11/2014 |
| EP | 3085716 | 10/2016 |
| EP | 3046942 A4 | 5/2017 |
| EP | 3190133 | 7/2017 |
| JP | 2016532726 | 10/2016 |
| KR | 2010080495 | 7/2010 |
| KR | 1492651 B1 | 2/2015 |
| WO | 199425514 | 11/1994 |
| WO | 2008066809 | 6/2008 |
| WO | 2009061982 | 5/2009 |
| WO | 2015041905 | 3/2015 |
| WO | 2015153316 | 10/2015 |
| WO | 2016204981 | 12/2016 |
| WO | 2018136258 | 7/2018 |

\* cited by examiner

Primary Examiner — John M Cooney

(57) ABSTRACT

A polyurethane foam-forming reaction mixture composition including: (I) an organic isocyanate; and (II) an admixture of: (a) at least one autocatalytic polyol; (b) at least one ethylene oxide (EO)-capped polyol; (c) at least one reactive blowing catalyst; (d) at least one surfactant; and (e) water; and a polyurethane foam prepared from the above polyurethane foam-forming reaction mixture composition.

8 Claims, No Drawings

POLYURETHANE FOAM SYSTEM

REFERENCE TO RELATED APPLICATIONS

The present application claims the benefit of U.S. Provisional Application No. 62/584,164, filed on Nov. 10, 2017.

FIELD

The present invention relates to a low emission polyurethane foam system and a method for preparing a foam from such system.

BACKGROUND

Flexible polyurethane foams are well recognized articles of commerce; and various polyurethane foam systems are known for producing flexible polyurethane foams for a wide variety of commercial applications such as in cushioning, seating, bedding, furniture, transportation interiors, carpet underlay, and packaging applications. Generally, reaction mixtures of polyols, polyisocyanates, catalysts and/or other additives are used to prepare foam-forming polyurethane reaction mixture compositions which in turn can be used to produce flexible polyurethane foams. However, there is an enormous variation in the compositional features of isocyanate compounds and the hydroxyl compounds use to prepare polyurethane foams; and when the isocyanate groups of the isocyanate compound react with the hydroxyl groups of the hydroxyl compound to form urethane linkages, a large number of polyurethane foam structures and performance profiles can result. Rigid foams, flexible foams and acoustic low-density foams are some examples of types of foam produced in the industry.

In some foam systems, even a slight change in concentration of the compounds used in the system can provide a foam system that has a different structure and that performs differently. In other foam systems, a change in a specific component used in the foam system can also provide a different foam product that may or may not perform adequately for the application desired. Thus, not all foam system compounds or dosages of foam system compounds perform alike to provide a workable foam system or to provide a foam product with adequate properties for a particular type of application.

For example, EP2039713B1 discloses foams made with amine-initiated autocatalytic polyols. In some cases, substituting an autocatalytic polyol for a different autocatalytic polyol can change the performance of the foam system. It has been surprisingly found that not all autocatalytic polyols perform alike to provide a workable foam system or to provide a foam product with adequate properties.

U.S. Provisional Patent Application No. 62/449,234, entitled "Flexible Polyurethane Foam and Process to Make," filed Jan. 23, 2017 by Grassini et al, discloses a resilient polyurethane foam product which exhibits very little change in compression set across a wide range of isocyanate indices. The above patent application further discloses the use of an autocatalytic polyol in combination with an amine-based urethane gelling catalyst such as RZETA™ (1,4-diazabicyclo[2.2.2]octane-2-methanol available from Tosoh Corporation) in the foam system to produce a low emission foam product.

Some of the disadvantages encountered with the use of the above known foam systems include for example, the resulting foam products made from such prior known systems do not exhibit advantageous processing properties such as fast reactivity, good flow, and sufficient polyol system stability while still maintaining reduced emissions so that the foam passes the VDA 278(2011) emission test. In addition, preparing a "fast-frothing/anti-gravity polyurethane foam" using a low emission catalyst in a foam system is challenging because of the large amount of total catalyst required to be used in such a system as compared to other polyurethane foam systems used for other applications.

SUMMARY

One aspect of the present invention is directed to a polyurethane foam-forming reaction mixture composition or system that advantageously is fast reacting, has good flow, and is storage stable while still having reduced emissions to pass the VDA 278(2011) emission test. In one embodiment, the reactive mixture composition of the present invention includes: (I) an organic isocyanate; and (II) an admixture of: (a) at least one autocatalytic polyol; (b) at least one ethylene oxide (EO)-capped polyol; (c) at least one reactive blowing catalyst; (d) at least one surfactant; and (e) water.

Another aspect of the present invention is directed to a process for making the above polyurethane foam-forming reaction mixture composition. In one embodiment, the polyurethane foam-forming composition or system exhibits advantageous processing properties such as (1) fast frothing/anti-gravity, (2) non-formulation separating, and (3) low emissions according to VDA 278(2011) emission test.

Still another aspect of the present invention is directed to a polyurethane foam prepared from the above polyurethane foam-forming reaction mixture composition. In one embodiment, the polyurethane foam-forming composition provides a flexible foam that is useful for filling vehicle cavities and that is self-opening such that no shrinkage of the resultant foam arises in the vehicle after the foam exotherm cools.

One of the benefits of the polyurethane foam-forming reaction mixture composition of the present invention is that a quality foam-forming reaction composition and a foam product therefrom can be made without the need for using, and in the absence of, a reactive gel catalyst and a primary amine diol which are used and required in conventional fast reacting polyurethane foam-forming reaction mixtures. The foam-forming reactive composition of the present invention surprisingly exhibits all of the above properties and performance. The combination of the above properties has not been possible heretofore until the present invention which uses a particular predetermined high EO capped polyol and a particular predetermined autocatalytic polyol in combination with a particular predetermined reactive blow catalyst to achieve the foam-forming reactive composition of the present invention.

DETAILED DESCRIPTION

The present invention provides a polyurethane foam system for producing a flexible polyurethane foam that exhibits a certain set of sufficient processability properties for various applications. For example, the desired foam properties or performance of the foam system can include (1) fast reactivity, (2) sufficiently high fast frothing sufficient to be considered as a highly reactive anti-gravity foam-forming composition, (3) good flow, (4) low emissions, and (5) storage phase stable polyol formulation. In one embodiment of the present invention, a particular selection, combination, and dosage of components is used to form the polyurethane foam system that exhibits the above beneficial properties and/or performance and provides a cavity blocking flexible polyurethane foam. Generally, a foam system is typically required to exhibit reduced emissions to meet VDA 278 (2011) emissions test which includes a VOC upper maximum target of less than (<) 100 μg/g and a FOG upper maximum target of <250 μg/g. The present invention foam beneficially meets the above targets.

In preparing the flexible polyurethane foam of the present invention, an A-side material and a B-side material are reacted together, wherein the A-side material includes at least one isocyanate-containing material (herein Component (I)) and the B-side material includes at least one polyol-containing material, usually a blend of at least one polyol, at least one catalyst, at least one surfactant, and water (herein Component (II)). In one broad embodiment, the present invention includes a polyurethane foam-forming reaction mixture composition including: (I) an organic isocyanate and other optional additives (A-side material); and (II) an admixture of: (a) at least one autocatalytic polyol; (b) at least one ethylene oxide (EO)-capped polyol; (c) at least one reactive blowing catalyst; (d) at least one surfactant; and (e) water (B-side material) and other optional additives. In another broad embodiment, the present invention includes a polyurethane foam prepared from the above polyurethane foam-forming reaction mixture composition.

In one illustrative embodiment, the polyurethane foam system of the present invention includes a polyurethane foam-forming reaction mixture composition including: (I) an organic isocyanate; and (II) an admixture of: (a) from about 1 weight percent (wt %) to about 50 wt % of an autocatalytic polyol; (b) from about 30 wt % to about 95 wt % of an ethylene oxide (EO)-capped polyol; (c) from about 0.2 wt % to about 2.5 wt % of one or more) reactive blow catalyst; (d) from about 0.1 wt % to about 2.5 wt % of a surfactant; and (e) from about 4 wt % to about 9 wt % of water.

Suitable organic isocyanates, component (a), for use in the foam-forming composition and process of the present invention include any of the organic isocyanates known in the art for preparing polyurethane foams, like aliphatic, cycloaliphatic, araliphatic and aromatic isocyanates. In one embodiment, aromatic polyisocyanates are generally preferred based on cost, availability and properties imparted to the product polyurethane. Exemplary polyisocyanates useful in the present invention include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane tri-isocyanate, polymethylene polyphenylisocyanates or mixtures thereof with MDI (polymeric MDI), hydrogenated polymethylene polyphenylisocyanates, toluene-2,4,6-triisocyanate, and 4,4'-dimethyl diphenylmethane-2,2',5,5'-tetraisocyanate. In one preferred embodiment, the polyisocyanates that can be used in the foam-forming composition of the present invention may include MDI and derivatives of MDI such as biuret-modified "liquid" MDI products and polymeric MDI, as well as mixtures of the 2, 4- and 2, 6-isomers of TDI.

Another preferred embodiment, the polyisocyanate is a polymeric MDI such as SPECFLEX™ NE 474; or a mixture of TDI isomers with MDI wherein the TDI isomers constitutes from 60 wt % to 90 wt % by weight of the mixture, and in which the 2,4-TDI isomer constitutes at least 70 wt % by weight of the TDI isomers such as VORANATE™ TM-20. The above VORANATE™ products are available from The Dow Chemical Company.

In one embodiment, the organic polyisocyanate or mixture thereof, in general, can have an average of 1.8 or more isocyanate groups per molecule. In another embodiment, the isocyanate functionality may be from about 1.9 to about 4, from about 1.9 to about 3.5 in still another embodiment, and from about 1.9 to about 2.9 in yet another embodiment.

In another preferred embodiment, the organic isocyanate useful in the flexible foam-forming polyurethane composition of the present invention may be 2,4-toluene diisocyanate, 2,6-toluene diisocyanate, a mixtures of 2,4-toluene diisocyanate and 2,6-toluene diisocyanate; 2,4'-diphenylmethane diisocyanate, 2,2'-diphenylmethane diisocyanate, 4,4'-diphenylmethane diisocyanate, a mixture of 2,4'-diphenylmethane diisocyanate, 2,2'-diphenylmethane diisocyanate, 4,4'-diphenylmethane diisocyanate; or mixtures thereof.

The amount of polyisocyanate that may be used in the flexible foam-forming polyurethane composition of the present invention generally can be an amount that is sufficient to provide an isocyanate index of from 70 to 125 in one embodiment. In another embodiment, the isocyanate index range may be from 75 to 110 and in still another embodiment, the isocyanate index range may be from 80 to 105. "Isocyanate index" herein means a value that is 100 times the ratio of isocyanate groups to isocyanate-reactive groups in a formulation.

Component (II), also referred to as the B-side material, of the foam-forming polyurethane composition is a blend or admixture of components including for example several polyol compounds. In a general embodiment, the B-side material includes a polyol blend comprising (a) at least one autocatalytic polyol and (b) at least one ethylene oxide (EO)-capped polyol; and other additives (described in detail herein below) including (c) at least one reactive blowing catalyst; (d) at least one surfactant; and (e) water.

One of the benefits of the present invention is that a non-separating, phase stable polyol formulation is provided when stored at room temperature (about 25° C.). The formulation of the present invention does not undergo any phase separation for an extended amount of time. The polyol system stability or storage stability is advantageous because a system that phase separates can cause index issues if phase separated system is used after separation which can result in a defective foam product. For example, in the automotive industry a quality foam-forming composition, from a handling point of view, is storage stable composition. By using a storage stable composition, no after mixing is needed by the end user; and the storage stable composition can be used directly from the delivery container.

The polyol-containing admixture useful in the present invention may include an autocatalytic polyol compound, such as those disclosed in U.S. Pat. Nos. 8,957,123; 7,361,695; 6,762,274; 6,924,321; and WO2015/153316A1, all of which are incorporated in their entirety herein by reference. In one embodiment, the autocatalytic polyol compound is a polyol containing at least one tertiary amine group having a functionality of 1 to about 8, preferably about 2 to about 8, more preferably about 2 to about 6, and a hydroxyl number of from about 15 to about 200. Aliphatic or aromatic amine based polyether polyols may be used in the invention include those made from reacting an aliphatic or an aromatic amine with one or more alkylene oxides.

In one embodiment, the autocatalytic polyol useful in the process of the present invention is an autocatalytic polyol compound having a functionality in the range of about 2 to about 8 and a hydroxyl number in the range of about 15 to about 200, wherein said autocatalytic polyol compound comprises at least one tertiary amine group, and said autocatalytic polyol being an amine initiated polyol obtained by alkoxylation of at least one initiator molecule selected from the group consisting of 3,3'-diamino-N-methyldipropylamine, 2,2'-diamino-N-methyldiethylamine, 2,3-diamino-N-methyl-ethyl-propylamine, or a mixture thereof.

In another embodiment, the autocatalytic polyol useful in the process of the present invention is an autocatalytic polyol compound based on an initiator of the following Formula (I):

$$H_mA\text{-}(CH_2)_n\text{—}N(R)\text{—}(CH_2)_p\text{-}AH_m \qquad \text{Formula (I)}$$

where in Formula (I), n and p are independently integers from 2 to 6; A at each occurrence is independently oxygen, nitrogen or hydrogen, with the proviso that only one of A can be hydrogen at one time; R is a $C_1$ to $C_3$ alkyl group; and m is equal to 0 when A is hydrogen, is equal to 1 when A is oxygen, and is equal to 2 when A is nitrogen.

In another embodiment, the autocatalytic polyol useful in the process of the present invention is an autocatalytic polyol compound as described in U.S. Pat. No. 6,924,321, incorporated herein by reference. The autocatalytic polyol compound may be obtained by alkoxylation of an initiator of the following Formula (II):

$$H_2N\text{—}(CH_2)_n\text{—}N(R)\text{—}H \qquad \text{Formula (II)}$$

where in Formula (II), n is an integer from 2 to 12; and R is a $C_1$ to $C_3$ alkyl group.

In a preferred embodiment of Formula (II), n may be an integer of 2 to 12, more preferably 2 to 6, and most preferably 2 to 4. In another preferred embodiment, R may be a methyl and n can be an integer of 2 to 4. Compounds of Formula (II) can be made by standard procedures known in the art. Examples of commercially available compounds of Formula (II) include N-methyl-1,2-ethanediamine and N-methyl-1,3-propanediamine.

In still another embodiment of the present invention, polyether polyols and polyurethane polymers can be produced using an initiator composition as described in WO2015/153316 A1, incorporated herein by reference. For example, the initiator composition may be a reaction product of a dihydroxy tertiary amine and a polyhydroxy alcohol. In a preferred embodiment, the dihydroxy tertiary amine used in the present invention has the following structure of Formula (III):

Formula (III)

wherein $R^1$ is hydrogen or a $C_1$-C6 linear or branched alkyl group; and $R^2$ and $R^3$ are independently a $C_1$-C6 linear or branched alkyl group. In another preferred embodiment, the dihydroxy tertiary amine may be a N-methyl diethanolamine (MDEA).

Suitable polyhydroxy alcohols useful in the present invention may include for example alcohols having from 2 to 8 hydroxyl groups; and can be $C_2$ to $C_{18}$ alkyl, aryl, or alkaryl compounds. The polyhydroxy alcohols may be linear, branched, or cyclic. In a preferred embodiment, the polyhydroxy alcohols may be methylenglycol (MEG), diethylenglycol (DEG), methylpropylenglycol (MPG), dipropyleneglycol (DPG), glycerol, trimethylol propane, (TMP), pentaerythritol, and sugars such as sucrose and sorbitol. In still another preferred embodiment, the polyhydroxy alcohols may be glycerine, glycol, sugars, or mixtures thereof.

A preferred initiator composition, shown in the following Scheme 1, can be the reaction products of MDEA and glycerine:

Scheme (I)

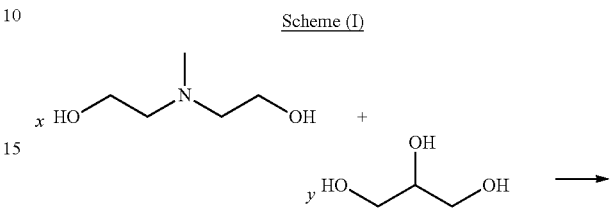

In Scheme (1) above, x is preferably an integer of from 1 to 10 and independently y is preferably an integer of from 1 to 10.

In one embodiment, the reaction product of the dihydroxy tertiary amine and the polyhydroxy alcohol may comprise a mixture of products as well as partially and/or completely unreacted tertiary amine and/or polyhydroxy alcohol. For example, in a preferred embodiment the reaction of N-methyl diethanol amine and glycerine in addition to unreacted N-methyl diethanolamine and/or glycerine, may yield a mixture of products as described in WO2015/153316 A1, incorporated herein by reference.

In another embodiment, the autocatalytic polyol useful in the process of the present invention is an autocatalytic polyol compound which contains an alkyl amine within the polyol chain or a di-alkylylamino group pendant to the polyol chain wherein the polyol chain is obtained by copolymerization of at least one monomer containing an alkyl aziridine or N,N-dialkyl glycidylamine with at least one alkylene oxide, preferably the alkyl or di-alkyl moiety of the amine is a $C_1$ to $C_3$ alkyl.

Useful aromatic amine based polyether polyols include those based on 1,2-, 1,3- and 1,4-phenylenediamine; 2,3-, 2,4-, 3,4- and 2,6-toluene diamine (TDA); 4,4'-, 2,4'- and 2,2'-diaminodiphenylmethane (DADPM); and/or polyphenyl-polymethylene-polyamine initiators. The alkoxylated aromatic amine polyols may contain alkoxylation products derived from other ingredients in the initiator mixture. In most cases they contain alkoxylation products of lower molecular weight diols and triols such as diethylene glycol, glycerine and/or water. In addition, the aromatic amine based polyether polyol may contain lower molecular weight diols and triols such as diethylene glycol, dipropylene glycol and/or glycerine. Aromatic amine based polyether polyols such as TDA-based polyether polyols and diaminodiphenylmethane or polymethylene polyphenylene polyamine (DADPM)-based polyether polyols have been described as suitable isocyanate-reactive compounds for rigid polyurethane foams (see, for example, EP 421269; EP 617068; EP 708127; WO 94/25514; and U.S. Pat. Nos. 5,523,332; 5,523,333; and 5,523,334, all of which are incorporated herein by reference).

The range of the autocatalytic polyol useful in the present invention may be dependent on the desired reactivity profile that is needed. Typically, the autocatalytic polyol compound is present in the B-side material in an amount equal to or greater than (≥) about 1 wt %, preferably ≥about 2 wt %, and more preferably ≥about 5 wt % based on the total weight of the B-side material. The autocatalytic polyol compound is present in the B-side material in an amount equal to or less than (≤) about 50 wt %, preferably ≤about 40 wt %, and more preferably ≤about 35 wt % based on the total weight of the B-side material. In one preferred embodiment, the amount of the at least one autocatalytic polyol is from about 1 wt % to about 50 wt % and from about 5 wt % to about 30 wt % in another embodiment.

The B-side material may also include one or more high EO-containing polyol compounds as component (b). For example, the polyol blend may include a polyether polyol, component (b). Suitable polyether polyols useful in the present invention have been fully described in the prior art and include reaction products of alkylene oxides, for example ethylene oxide and/or propylene oxide, with initiators having a functionality of from 2 to about 8, preferably about 2 to about 4, and an average hydroxyl number preferably from about 5 to about 100, more preferably from about 10 to about 80, and more preferably from about 15 to about 60. Of particular importance for the preparation of the flexible polyurethane foams of the present invention are polyether polyols and polyol mixtures having a functionality ≥2 and ≤4. Preferably, the polyol or polyols have an average molecular weight of from about 100 to about 10,000 and more preferably of from about 200 to about 8,000.

Suitable initiators for the present invention include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Still further suitable isocyanate-reactive components include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive components may be used as well. Most preferably polyols are used which do not comprise primary, secondary or tertiary nitrogen atoms.

Of particular importance for the preparation of the flexible polyurethane foams of the present invention are polyether polyols and polyol mixtures having a hydroxyl number of ≤about 100, preferably ≤about 80, and more preferably ≤about 60. Hydroxyl number indicates the number of reactive hydroxyl groups available for reaction. It is expressed as a number of milligrams of potassium hydroxide equivalent to the hydroxyl content of one gram of polyol.

Of particular importance for the preparation of the flexible foams are reaction products of alkylene oxides, for example ethylene oxide and/or propylene oxide, with initiators containing from 2 to 8, preferably 2 to 4 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Preferred polyols are the polyether polyols comprising ethylene oxide and/or propylene oxide units and most preferably polyoxyethylene polyoxypropylene polyols having an oxyethylene content of at least about 10 wt % and preferably from about 10 wt % to about 85 wt %. A preferred isocyanate-reactive component comprises an ethylene oxide-capped polyether polyol.

Typically, the polyether polyol, component (b) may be present in the B-side material in an amount of ≥about 30 wt %, preferably ≥about 40 wt %, and more preferably ≥about 50 wt % based on the total weight of the B-side material. The polyether polyol (b) (ii) is present in the B-side material in an amount of ≤about 95 wt %, preferably ≤about 90 wt %, more preferably ≤about 85 wt %, and most preferably ≤about 80 wt % based on the total weight of the B-side material. In one preferred embodiment, the amount of the at least one ethylene oxide (EO)-capped polyol can be from about 30 wt % to about 95 wt %; and from about 60 wt % to about 85 wt % in another embodiment.

In one embodiment, the EO-containing polyol compound, component (b), of the present invention has a high percentage of EO content. For example, the EO content of the polyol in general can be >about 15 wt % in one embodiment, >about 17 wt % in another embodiment, and >about 19 wt % in still another embodiment. In another general embodiment, the EO content of the polyol can be from about 15 wt % to about 50 wt %, from about 17 wt % to about 40 wt % in still another embodiment, and from about 19 wt % to about 30 wt % in yet another embodiment.

In addition to the blend of polyols, Component (II) may also include a reactive blow catalyst, a surfactant and water; and other optional additives. Component (c) useful in the B-side material of the present invention can be at least one reactive blowing catalyst compound. For example, in one embodiment, the catalyst, component (c), useful in the B-side material of the foam-forming composition of the present invention can be at least one tertiary amine catalyst, which may be selected from any effective tertiary amine Such selections such may typically include the N-alkylmorpholines, N-alkylalkanolamines, aminoalcohols, N,N-dialkylcyclohexylamines, alkylamines where the alkyl groups are methyl, ethyl, propyl, butyl and isomeric forms thereof, and heterocyclic amines Non-limiting specific examples thereof include 1-methylimidazole, triethylenediamine, tetramethylethylenediamine, bis(2-dimethyl-aminoethyl) ether, triethanolamine, triethylamine, tripropylamine, triisoprpylamine, tributylamine, triamylamine, pyridine, quinoline, dimethylpiperazine, N,N-dimethylcyclohexyl-amine, N-ethyl-morpholine, methyltriethylene-diamine, N,N',N"-tris(dimethylaminopropyl)-sym-hexahydrotriazine, and combinations thereof. A preferred group of tertiary amines comprises 1-methyl-imidazole, 2-ethyl-4-methyl-imidazole, 2-ethylbutyldiisopropylamine, triethylenediamine, triethylamine, triisopropylamine, and combinations thereof.

The tertiary amine catalyst may be any compound possessing catalytic activity for the reaction between a polyol and an organic polyisocyanate; and at least one tertiary amine group. Representative tertiary amine catalysts useful in the present invention include for example trimethylamine, triethylamine, dimethylethanolamine, N-methylmorpholine, N-ethylmorpholine, N,N-dimethyl-benzylamine, N,N-dimethylethanolamine, N,N,N',N'-tetramethyl-1,4-butanediamine,N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyebis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) aminoethoxy ethanol, N, N, N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, and 1,2-ethylene piperidine and methyl-hydroxyethyl piperazine. Preferred tertiary amine catalysts are one or more of N,N,N'-trimethyl-N'-hydroxyethyl-bisaminoethylether (available as JEFFCAT™ ZF-10 from Huntsman Corporation and as TOYOCAT™ RX 10 from Tosoh Corporation), N,N-bis(3-dimethylaminopropyl)-N-isopropanol amine (JEFFCAT ZR-50), N-(3-dimethylaminopropyl)-N, N-diisopropanolamine (JEFFCAT DPA), 1,3-propanediamine, N'-(3-(dimethylamino) propyl)-N,N-dimethyl (JEFFCAT Z-130), N,N,N'-trimethyl aminoethyl-ethanolamine (JEFFCAT Z-110), bis-(2-dimethylaminoethyl)ether (JEFFCAT ZF-20), N,N-dimethylethanolamine (DMEA), benzyldimethylamine (BDMA), N,N-dimethyl cyclohexylamine (DMCHA), pentamethyl diethylenetriamine (PMDETA), N,N,N', N'',N''-pentamethyl-dipropylene triamine (JEFFCAT ZR-40), dimethylaminopropyl amine (DMAPA), (3-aminopropyl dimethylamine, 1,1'-[[3-(dimethylamino)propyl]imino]bispropan-2-ol) (JEFFCAT LE-310), NIAX EF 600; DABCO NE 1070, and mixtures thereof.

In one preferred embodiment, the reactive blow catalyst useful in the present invention may include for example catalysts such as >90% N-[2-[2-(dimethylamino)ethoxy]ethyl]-N-methyl-1,3-propanediamine (DABCO NE 300 available from Evonik); NIAX EF 100; N,N,N'-trimethyl-N'-hydroxyethyl-bisaminoethylether (available as JEFFCAT™ ZF-10 from Huntsman Corporation); N,N-bis(3-dimethylaminopropyl)-N-isopropanolamine (JEFFCAT ZR 50).

The foam-forming composition may contain a blow catalyst, such as tertiary amine catalysts, generally in an amount of from >about 0.01 wt % to ≤about 5 wt % based on the total weight of the B-side material. For example, in one preferred embodiment, the tertiary amine catalyst is present in an amount of ≥about 0.01 wt %, preferably ≥about 0.1 wt %, more preferably ≥about 0.15 wt %, and most preferably ≥about 0.2 wt % based on the total weight of the B-side material. Preferably the tertiary amine catalyst is present in an amount of ≤about 5 wt %, preferably ≤about 3 wt %, more preferably ≤about 2.5 wt %, and most preferably ≤about 2.0 wt % based on the total weight of the B-side material. In one preferred embodiment, the amount of the of the at least one reactive blowing catalyst can be from about 0.2 wt % to about 2.5 wt %; and from about 0.3 wt % to about 2.0 wt % in another embodiment.

It has been surprisingly found that by combining the reactive blow catalyst at the high amounts described above, the autocatalytic polyol described above, and the high EO-containing polyether polyol, a fast reactivity profile (while at the same time passing VDA 278(2011) for the foam of the present invention can be obtained; and a storage stable polyol formulation can be made even in spite of high levels of water.

The B-side material comprises one or more surfactants, component (d). A surfactant is preferably included in the foam formulation to help stabilize the foam as it expands and cures. Examples of surfactants include nonionic surfactants (or organo-modified polysiloxanes) and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include polysiloxane/polyether copolymers such as TEGOSTAB™ B-8729, B-8404, B-8736, B-8870, B-8719LF, B-8734LF2, B-8747LF2, B-8761LF2, and B-8715LF2 available from Evonik; DABCO™ DC-198 available from The Dow Chemical Company; and NIAX™ L2171 surfactant from Momentive Performance Materials. Non-hydrolyzable liquid organosilicones are more preferred.

Each surfactant is typically present in an amount of ≥about 0.1 wt %, preferably ≥about 0.2 wt %, and more preferably ≥about 0.5 wt % based on the total weight of the B-side material. Each surfactant is typically present in an amount of ≤about 5 wt %, preferably ≤about 2 wt %, and more preferably ≤about 1.3 wt % based on the total weight of the B-side material. In one preferred embodiment, the amount of the at least one surfactant is from about 0.1 wt % to about 2.5 wt %; and from about 0.2 wt % to about 1.2 wt % in another embodiment.

The B-side material further comprises water, component (e) which, as is well known, may perform both a blowing function and/or a chain extension function by reacting with isocyanate groups to generate carbon dioxide and form urea linkages. Water is preferably the sole blowing agent in the foam formulation of the present invention, although it is possible to include an auxiliary blowing agent within the foam formulation in addition to the water. The auxiliary blowing agent may be a chemical type such as a carbamate or a physical blowing agent such as, for example, carbon dioxide or a low-boiling hydrocarbon, hydrofluorocarbon or hydrochlorofluorocarbon. In the preferred case in which water is the sole blowing agent, the amount of water is an important contributing factor to the density of the resulting foam.

The water is typically present in the foam-forming formulation in an amount of ≥about 1 wt %, preferably ≥about 2 wt %, and more preferably ≥about 3 wt % based on the total weight of the B-side material. The water is typically present in the formulation in an amount of ≤about 15 wt %, preferably ≤about 10 wt %, and more preferably ≤about 8 wt % based on the total weight of the B-side material. In one illustration of the present invention, the foam-forming composition can include water in a concentration of from about 3 wt % to about 7 wt %. In one preferred embodiment, the amount of water present in the formulation is from about 4 wt % to about 9 wt %; and from about 5 wt % to about 8 wt % in another embodiment.

Not to be held to any specific theory, it is theorized that the ability to produce the low emissions flexible polyurethane foam of the present invention with advantageous properties may be due to the particular combination of compounds described above; and the desirable properties for the foam of the present invention may be realized in the absence of a primary amine diol and in the absence of a non-reactive gel catalyst in the foam-forming composition of the present invention.

Other additional optional compounds or additives may be added to either the A-side material and/or the B-side material as desired. One or more additional types of other materials, as may be useful in the manufacturing process used to make the foam-forming composition or to impart desired characteristics to the resulting foam, may be used including for example, catalysts, blowing agents, cell openers, surfactants, crosslinkers, chain extenders, fillers, colorants, flame retardants, pigments, antistatic agents, reinforcing fibers, antioxidants, preservatives, acid scavengers, aldehyde scavengers, and a mixture thereof.

The optional component, when used in the foam composition, can be present in an amount generally in the range of from 0 wt % to about 10 wt % in one embodiment; from about 0.1 wt % to about 8 wt % in another embodiment; and from about 0.2 wt % to about 5 wt % in still another embodiment.

In one broad embodiment, the process for making the reactive foam-forming composition of the present invention may include the steps of: (a) preparing a reactive formulation including an A-side material and a B-side material; and (b) mixing the A-side material and B-side material forming a reactive blend; and (c) subjecting the reactive blend to conditions sufficient to cure the reactive blend to form a flexible polyurethane foam.

In a preferred embodiment, the process according to the present invention includes the step of contacting (i) an A-side material comprising, consisting essentially of, or consisting of: (I) an organic isocyanate, for example MDI, TDI, or mixtures thereof with (ii) a B-side material comprising, consisting essentially of, or consisting of: (II) an admixture comprising, consisting essentially of, or consisting of: (a) at least one autocatalytic polyol; (b) at least one high EO-containing polyol; (c) at least one reactive blowing catalyst; (d) at least one surfactant; and (e) water. One or more additional optional components may be added to the A-side material, the B-side material, or both.

The A-side material and B-side material are mixed together to form a reactive blend. In one embodiment, the A-side material and B-side material are mixed together at a temperature of about 50° C. or lower. In another embodiment, the A-side material and B-side material are mixed together at a temperature of from about 10° C. to about 40° C.; and from about 10° C. to about 30° C. in still another embodiment. The A-side material and B-side material are also mixed together at the desired ratio. For example, the A-side material:B-side material ratio can be from about 40:100 to about 90:100 by weight. The B-side material containing the polyol and other compounds can be premixed; and then the premix material (B-side material) and the organic polyisocyanate component (A-side material) may be mixed together by any known urethane foaming equipment. Mixing together the A-side material with the B-side material to form the reactive formulation, in turn, allows for the foaming reaction to occur which ultimately forms a cured flexible polyurethane foam.

The foam-forming composition of the present invention may be advantageously utilized for filling cavities. For example, the composition can be used for filling cavities in automobiles and transportation vehicles (e.g. bus, train, tram, trucks, tractors, boats and the like) during the manufacturing process of the vehicles. The foam-forming composition of the present invention prepared by the above process during the reaction of the components in the composition forms a fast-frothing/anti-gravity polyurethane foam (e.g., <about 10 seconds (s) gel time and <about 20 s tack free time) that is essentially "free rise". Another benefit of the present invention is that the foam can substantially adhere to steel, e-coat, and other common surfaces.

By "fast-frothing/anti-gravity" herein it is meant that cream time is not discernable by visual observation; or cream time is <2 s. "Anti-gravity" herein means that the foam reaction mix stays where it was placed, or stays very near to where the foam reaction mixture is placed because the foam rises so rapidly that the foam-forming system cannot move away from where the foam is placed and cannot run through cracks and holes in a structural member.

In addition, the foam-forming composition of the present invention exhibits fast reactivity, good rising foam flow, and sufficient storage stability while still maintaining reduced emissions so that the foam passes the VDA 278(2011) emissions test.

By "fast reactivity" herein, with regard to a foam-forming composition, means the composition exhibits a gel time of <about 12 s and a tack free time of <about 25 s.

By "good flow" herein, with regard to a foam-forming composition, means the composition exhibits a cavity density of not more than about 60% of the free rise density.

By "sufficient storage stability" herein, with regard to a foam-forming composition, means the polyol formulation of the reactive composition can be used without re-blending the polyol formulation at the time of use; and when mixed with the isocyanate component, the reactive composition results in a foam product of the present invention as described herein.

In addition, the foam-forming composition of the present invention exhibits several enhanced properties including a decrease in cream time, gel time, tack free time, and free rise density. For example, in certain exemplary processes, it is preferable that the polyol-containing component and the polyisocyanate-containing component begin to foam quickly to provide an initial sag resistance as the polyurethane formation reaction proceeds. One measure of the rapidity of foaming is known as "cream time (CT)", which is defined as the elapsed time between the dispensing of the polyisocyanate-containing component and polyol-containing component and the moment when the combined components start to rise as detected by visual observation. Another description of CT is a measure of the time when bubbles start forming in the reaction mixture as detected by visual observation. During the foaming process, the foam-forming formulations or compositions and processes of the present invention described herein will yield foams with a CT that is generally from 0 s to about 4 s, preferably from 0 s to about 2 s, and more preferably from 0 s to about 1 s.

In certain exemplary processes, it is preferable that the polyol-containing component and the polyisocyanate-containing component react and gel quickly to ensure that the foam remains substantially contained within the cavity or on the substrate of interest. One measure that is useful for characterizing foams is known as the "gel time (GT)." GT herein means a measure of the time when a macroscopic crosslinked network starts to form during the reaction of the reaction mixture. One exemplary method of determining GT comprises dispensing a fixed mass (e.g., 60 g) of foam into a paper cup Immediately following the dispensing step, the edge of a clean wooden tongue depressor is repeatedly contacted with the expanding foam surface. Once a string of material is formed from the combined polyisocyanate component and the polyol containing component, the elapsed time is recorded. The process is preferably repeated several times, and the GT is calculated as the average elapsed time between the dispensing of the polyisocyanate-containing component and polyol-containing component and the formation of a string of material from the combined components. The foam-forming composition of the present invention prepared in the manner described herein exhibits a GT that is generally from about 4 s to about 20 s, preferably from about 5 s to about 15 s, and more preferably from about 6 s to about 12 s.

In certain exemplary processes, it is preferable that the polyol-containing component and the polyisocyanate-containing component react quickly and produce a foam product with a tack free surface which is another measure of the rapidity of foaming; and which is known as "tack free time (TFT)". TFT herein means a measure of the time when the surface of the reacting foam mixture starts becoming non-fluid or dry (i.e., not wet to the touch).

One exemplary method of determining TFT comprises pouring the foam composition described above using a dispensing machine into a container or cup. Then using a clean tongue depressor (TD), the surface of the foam is contacted (tapped) several times with the broad surface of the TD as the foam reaches a maximum height. Each tap is done with a new clean TD and on a new location on the surface of the rising foam. Initially, the first TD is not clean, viz, some reacting surface polyurethane reaction mixture is attached to the surface of the TD. Eventually, after the use of several TDs, the final TD is substantially free of adhesion of any of the reacting surface polyurethane reaction mixture. The time the final TD is substantially free of adhesion of reaction, which is made by visual observation, the time is recorded as the "tack free time". The TFT of a foam, as aforementioned, can be an indication of the fast reacting of the foam composition of the present invention. This is an indication of the surface cure and end of rise for such foams. In general, the TFT of the foam-forming composition can be from about 10 s to about 30 s, preferably from about 15 s to about 25 s, and more preferably from about 17 s to about 22 s.

As aforementioned, polyurethane foams may be characterized by a density measurement known as "free rise density (FRD)." FRD herein means a measure of the natural density of a minimal hindered rise in an open mold. In certain illustrative embodiments, the foam-forming composition of the present invention exhibits a FRD of generally from about 15 kg/cm$^3$ to about 50 kg/cm$^3$, preferably from about 17 kg/cm$^3$ to about 40 kg/cm$^3$, and more preferably from about 18 kg/cm$^3$ to about 35 kg/cm$^3$.

Free rise density may be determined by weighing a cup of a pre-determined volume (e.g., a 16 fluid oz. cup or 32 fluid oz. cup) and over-filling the cup with foam to create a crown that rises above the cup's rim. The foam is then fully cured for a period of about 15 minutes, and the crown is cut off to ensure that the foam closely conforms to the cup volume. The cup is again weighed with the foam in the cup, and the weight of the foam is determined by calculating the difference between the weight of the foamed cup and the weight of the cup prior to foaming. The free rise volume is then determined by dividing the foam weight by the cup volume. To improve the accuracy of the method, a cup of the same model may be pre-weighed and filled to the cup's rim with water, which has a density of 1 g/cm$^3$. The cup may then be re-weighed. The true volume of the cup in cubic centimeters may then be determined by subtracting the weight of the pre-weighed cup from the weight of the water-filled cup. The previously calculated foam weight may then be divided by the true cup volume to obtain the FRD of the foam.

In one broad embodiment, the process for making the foam product of the present invention may include the steps of: (a) providing a reactive formulation including an A-side material (an organic isocyanate) and a B-side material an admixture of: (a) at least one autocatalytic polyol; (b) at least one ethylene oxide (EO)-capped polyol; (c) at least one reactive blowing catalyst; (d) at least one surfactant; and (e) water); and (b) mixing the A-side material and B-side material forming a reactive blend foam-forming composition; and then (c) subjecting the reactive blend to process conditions sufficient to cure the reactive blend to form a flexible polyurethane foam.

In a preferred embodiment, the foam-forming composition of the present invention is prepared as described above and then the foam-forming composition is subjected to process conditions such as a curing temperature to form the foam product. For example, in a process for filling cavities, the reaction mixture is dispensed into a cavity where curing occurs at a temperature of from about 15° C. to about 30° C. As the reaction mixture is charged to the cavity, the mixture expands and fills the cavity and produces a foam having the aforementioned properties. Advantageously, the composition is non-formulation separating such that the none of the components in the composition separate out from the composition before foaming because the composition maintains a shelf stability of >about 6 months. In addition, the reaction composition has a fast-frothing/anti-gravity value, for example, a cream time of <1 s, a gel time of <11 s, a tack free time of <25 s; and therefore, the composition can rapidly fill a cavity where the foam is positioned, without running away, and the resultant foam seals the cavity with an acoustic management/blocking open celled foam. The resultant foam advantageously may not significantly shrink after cooling for about 1 hour in one embodiment; and after cooling for 24 hours in another embodiment. Moreover, the foam conforms to VDA 278(2011) with very low emissions. The advantage of the present invention is that the foam composition exhibits fast reactivity time which provides a composition with good processability.

Freshly prepared polyurethane foams often exhibit the typical odor of amines; and give rise to increased fogging and emissions of volatile organic compounds (VOC). Moreover, to obtain high reactivity rates, more different catalysts and more amounts of catalysts are commonly used in the reactive foam-forming composition which results in even worse VOC emissions. For car interior applications, for example, amine emissions from polyurethane foam are undesirable and some car manufacturers request that all VOCs be significantly reduced or eliminated. The flexible polyurethane foam products produced by the process of the present invention have several benefits over the known foams including for example, reduced values for VOC and fogging (FOG).

In one embodiment, when the foam-forming composition is reacted, the resultant foam made in accordance with the present invention has low emissions (and therefore, low VOC and low FOG). In general, the foam-forming composition of the present invention exhibits a VOC of <about 100 micrograms/grams (μg/g) and a FOG value of <about 250 μg/g according to VDA 278 (2011) in one embodiment; a VOC of from 0 μg/g to about 250 μg/g and FOG of from 0 μg/g to about 600 μg/g in another embodiment; a VOC of from 0 μg/g to about 175 μg/g and FOG of from 0 μg/g to about 400 μg/g in still another embodiment; and a VOC from 0 μg/g to about 100 μg/g and FOG of from 0 μg/g to about 250 μg/g in yet another embodiment. A foam having Low emissions is important because the foam is typically used in the "interior of a vehicle" or between the exterior and the interior of a vehicle; and it is desirable to have low emissions for such applications.

Another beneficial utility of the present invention foam is its use for reducing acoustic transmission. When the foam-forming composition of the present invention reacts, the composition provides an open cell foam having an open cell content and a low density; and a foam product with the above properties allows the present invention foam to be used in acoustic applications. For example, the foam made in accordance with the present invention is of a resilient flexible type and advantageously has a FRD value generally in the range of from about 15 kg/m$^3$ to about 50 kg/m$^3$, preferably from about 20 kg/m$^3$ to about 45 kg/m$^3$, more preferably from about 25 kg/m$^3$ to about 40 kg/m$^3$, and most preferably from about 27 kg/m$^3$ to about 35 kg/m$^3$. FRD is conveniently measured by the method described herein above.

As aforementioned, the foam made in accordance with the present invention is an open celled flexible foam and is excellent for sound absorption. The foam advantageously has open cells generally greater than about 70 percent (%) and preferably greater than 80%. In another embodiment, the percentage of open cells in the foam product can be from 70% to about 100%.

In another embodiment, the foam of the present invention may be "substantially shrink free" or exhibits "reduced shrinkage". "Substantially shrink free" or "reduced shrinkage", with reference to a foam product, herein means a dimensionally stable foam product after cooling the foam after about 24 hours, viz, the foam exhibits no, or reduced, shrinkage upon cooling the foam after the foam is cured (e.g., 15 minutes elapsed time versus 24 hours later). For example, the percentage of shrinkage of the foam product can be from 0% to less than about 10%, preferably from 0% to less than about 7%, and more preferably from 0% to less than about 3%. Shrinkage of the foam can be conveniently measured by visually checking the foam and measuring the dimensions of the foam in 3 dimensions before and after cooling the foam product of the reaction of the A-side and B-side components.

In a general embodiment of the present invention, the foam-forming composition can be used for making foam articles for various applications. In one preferred embodiment, the fast-frothing, anti-gravity foam system is used for producing a flexible acoustic low-density foam useful, for example, in acoustic applications. The foam-forming composition of present invention can be used, for example, to produce a sound mitigation flexible foam product (acoustic foam product) since the rapid expandable foam composition of the present invention can be capable of filling and sealing three-dimensional cavities. The polyurethane foam of the present invention advantageously offers NVH (noise, vibration and harshness) benefits; the polyurethane foam of the present invention advantageously adheres to primed metal surfaces (e.g., such as metal structural members used in the automobile industry); and the foam product advantageously exhibits a combination of insulating and sealing performances.

The foam-forming composition of the present invention may be useful in application wherever cavity sealing is required such as body-side joints; sills; pillars; underbody cross-car structures; frame rails; longitudinal structures; door panels; engine cradles; lateral rails; and as hydroformed replacements. For example, the expandable foam components can be inserted throughout body-in-white cavities such as rocker panels and support pillars.

The foam made in accordance with the invention may also be useful in a variety of packaging, seating, and other cushioning applications such as mattresses; furniture cushions; transportation applications; automotive seating; bumper pads; sport and medical equipment; helmet liners; pilot seats; earplugs; battery encapsulation; marine hull cavities; bus and truck walls; and various other noise and vibration dampening applications.

EXAMPLES

The following examples are presented to further illustrate the present invention in detail but are not to be construed as limiting the scope of the claims. Unless otherwise indicated, all parts and percentages are by weight.

Various terms and designations used in the examples which follow are explained hereinbelow.

DOWFAX 92N20 is a mixed oxide (PO/EO) polyether polyol with a nominal functionality of 2, with a hydroxyl number of between 26 and 29, and with an EO content of 20 wt %. DOWFAX 92N20 is available from The Dow Chemical Company.

VORANOL 3322 is a mixed oxide (PO/EO) polyether polyol with a nominal functionality of 3 and with a hydroxyl number of between 46 and 50; and is available from The Dow Chemical Company.

SPECFLEX ACTIV 2306 is an amine-initiated, autocatalytic polyether polyol having a nominal functionality of about 4 and a hydroxyl number of between 31.0 and 40.0; and is available from The Dow Chemical Company.

JEFFAMINE D-400 is a polyether polyol (all PO) with nominal primary amine end functionalities; and is supplied by Huntsman.

DABCO NE1070 is an amine reactive gel catalyst; and is available from Evonik.

DABCO NE300 is a low emission mainly blowing reactive amine catalyst; and is available from Evonik.

TEGOSTAB B-8734 LF2 is a low emission silicon surfactant; and is available from Evonik.

TEGOSTAB B-8747 LF2 is a low emission silicon surfactant; and is available from Evonik.

NIAX EF 600 is a high molecular weight (Mw) tertiary amine reactive gel catalyst; and is available from Momentive.

JEFFCAT LE-310 is an amine reactive gel catalyst; and is available from Huntsman.

SPECFLEX NE 474 is a polymeric MDI isocyanate; and is made by The Dow Chemical Company.

Test Methods

Gel time tests, cream time tests, rise time tests, and free rise density tests were each conducted according to the procedures described herein above. VOC emission and FOG emission tests were conducted according to the procedure described in VDA 278(2011).

Example 1 and Comparative Examples A-E

The Examples described in Table I include a formulated polyol blend reacted with MDI. The MDI has an isocyanate content of about 31% by weight. The polyol blend (B-side material) and polymeric MDI (A-side material) are mixed in a polyurethane dispense machine. This dispense machine is a standard machine that is available in the market for example from equipment Suppliers like Henneke, Krauss Maffei and Cannon. In the Examples prepared as described in Table I, a Cannon AP10 dispensing equipment with an LN5 impingement mixing head was used; and the formulations were subjected to the following processing conditions:

The dispense machine is capable of mixing a given foam-forming system at a given ratio of isocyanate to polyol. The ratio is controlled by the pump/motor size. The dispense temperature of the material is generally in the range of 20° C. to 60° C. In the Examples, the temperature of the polymer T (poly) was 40° C.; and the temperature of the isocyanate T (iso) was 40° C.

The dispense pressure, at the 40° C. material temperature, is generally in the range of 140 bar to 200 bar. In the Examples, the pressure of the polymer was 150 bar and the pressure of the isocyanate was 150 bar.

Generally, material dispense flow rate is in the range of 50 g/s to 800 g/s at the mix-head. In the Examples, the output flow rate was 90 g/s.

The shot weight was 55 g.

The isocyanate:polyol mixing ratio by weight is given for each of the Examples listed in Table I.

TABLE I

Foam-Forming Formulations

| Formulation Component | Function of Component | Nom. Func.[1] | EW | OH No. | Comparative Example A[2] | Comparative Example B | Comparative Example C | Example 1 | Comparative Example D | Comparative Example E |
|---|---|---|---|---|---|---|---|---|---|---|
| Voranol 3322 | Network Building Standard Polyol | 3.0 | 1,181 | 47.5 | 22.7 | 22.7 | 22.7 | | | |
| DOWFAX 92N20 | Hydrophilic Fast Reactivity Diol | 2.0 | 2,040 | 27.5 | 77.3 | 77.3 | 77.3 | 80.0 | 70.0 | 70.0 |
| Specflex Activ 2306 | Autocatalytic Polyol | 4.0 | 1,524 | 36.8 | | | | 20.0 | 30.0 | 30.0 |
| Jeffamine D-400 | Primary Amine, Fast Reacting Diol | 4.0 | 200 | 301 | 3.4 | 3.4 | 3.4 | | | |
| Dabco NE1070 | Reactive Gel Catalyst | | 203 | 730 | 2.3 | | | | | |
| Dabco NE300 | Reactive Blow Catalyst | | 276 | 276 | 1.1 | 1.1 | 1.1 | 1.1 | | 0.2 |
| Tegostab B-8734LF-2 | Low Emissions Surfactant | | 0 | 85 | 0.6 | 0.5 | 0.6 | 0.6 | | |
| Tegostab B-8747 LF2 | Low Emissions Surfactant | | | | | | | | 0.4 | 0.4 |
| Niax EF 600 | Reactive Gel Catalyst | | 39.2 | 1,430 | | | 2.45 | | | |
| Jeffcat LE-310 | Reactive Gel Catalyst | | 109.1 | 514 | | 2.3 | | | | |
| Water | Indirect Chemical Blowing Agent | | 9 | 6,233 | 6.25 | 6.25 | 5.75 | 6.25 | 6.25 | 6.25 |
| | Total Parts | | | | 113.7 | 113.6 | 113.3 | 108.0 | 106.7 | 106.9 |
| | OH# OF THE POLYOL BLEND | | | | 55.1 | 50.7 | 71.4 | 30.5 | 28.4 | 28.9 |
| Specflex NE 474 | Isocyanate | NCO | | 31.31 | | | | | | |
| | Index | | | | 84 | 84 | 84 | 84 | 84 | 84 |
| | g ISO (I) FOR 100 g POLYOL BLEND (P) | | | | 79.9 | 79.1 | 77.9 | 78.6 | 79.1 | 79.0 |
| | Ratio P/I | | | | 1.25 | 1.26 | 1.28 | 1.27 | 1.26 | 1.27 |

| Test | | Test Results | | | | | |
|---|---|---|---|---|---|---|---|
| Cream Time (s) | | n/a | n/a | n/a | n/a | 5 | 4 |
| Gel Time (s) | | 8 | 8 | 8 | 10 | 30 | 23 |
| Tack Free Time (s) | | 20 | 18 | 20 | 20 | 130 | 75 |
| Density (kg/m$^3$) | | 29 | 30 | 30 | 30 | 38 | 36 |

| VDA 278(2011) | Target | | | | | | |
|---|---|---|---|---|---|---|---|
| VOC Emission[3] (μg/g) | First reading <100 | 780 | 201 | 101 | 92 | 100 | 67 |
| | Second reading <100 | 467 | 143 | 120 | 92 | 80 | 69 |
| FOG Value (μg/g) | <250 | 1,286 | 269 | 462 | 231 | 67 | 69 |

[1]"Nom. Func." = nominal functionality

[2]Comparative Example A is a reference material that is considered a cavity-filling acoustic foam and a non-low emission composition.

[3]Two VOC emissions readings were measured.

What is claimed is:

1. A polyurethane foam-forming reaction mixture composition comprising:
(I) an organic isocyanate; and
(II) an admixture of:
(a) from about 1 to about 50 weight percent based on the weight of the admixture of at least one autocatalytic polyol;
(b) from about 30 to about 95 weight percent based on the weight of the admixture of at least one ethylene oxide (EO)-capped polyol, wherein the content of the ethylene oxide present in the at least one ethylene oxide (EO)-capped polyol is from about 19 weight percent to about 30 weight percent based on the weight of the at least one ethylene oxide (EO)-capped polyol;
(c) from about 0.2 to about 2.5 weight percent based on the weight of the admixture of at least one reactive blowing catalyst;
(d) from about 0.1 to about 2.5 weight percent based on the weight of the admixture of at least one surfactant; and
(e) from about 4 to about 9 weight percent based on the weight of the admixture of water;
wherein the at least one reactive blowing catalyst is N,N,N'-trimethyl-N'-aminopropyl-bis(aminoethyl) ether.

2. The foam-forming composition of claim 1, wherein the autocatalytic polyol is an amine-initiated, autocatalytic polyoxyethylene-capped polyoxypropylene polyol.

3. The foam-forming composition of claim 1, wherein the ethylene oxide (EO)-capped polyol is a polyoxyethylene-capped polyoxypropylene polyol.

4. The foam-forming composition of claim 1, wherein the surfactant is an organo-modified polysiloxane surfactant.

5. The foam-forming composition of claim 1, wherein the amount of the at least one autocatalytic polyol is from about 5 weight percent to about 30 weight percent; the amount of the at least one ethylene oxide (EO)-capped polyol is from about 60 weight percent to about 85 weight percent; the amount of the at least one reactive blowing catalyst is from about 0.3 weight percent to about 2.0 weight percent; the amount of the at least one surfactant is from about 0.2 weight percent to about 1.2 weight percent; and the amount of water is from about 5 weight percent to about 8 weight percent; wherein all weight percentages are based on the weight of the admixture.

6. The foam-forming composition of claim 1, wherein the content of the ethylene oxide present in the at least one ethylene oxide (EO)-capped polyol is from about 19 weight percent to about 25 weight percent.

7. A process for making a foam-forming reaction mixture composition comprising admixing:
(I) an organic isocyanate; and
(II) an admixture of:
(a) from about 1 to about 50 weight percent based on the weight of the admixture of at least one autocatalytic polyol;
(b) from about 30 to about 95 weight percent based on the weight of the admixture of at least one ethylene oxide (EO)-capped polyol, wherein the content of the ethylene oxide present in the at least one ethylene oxide (EO)-capped polyol is from about 19 weight percent to about 30 weight percent based on the weight of the at least one ethylene oxide (EO)-capped polyol;
(c) from about 0.2 to about 2.5 weight percent based on the weight of the admixture of at least one reactive blowing catalyst;
(d) from about 0.1 to about 2.5 weight percent based on the weight of the admixture of at least one surfactant; and
(e) from about 4 to about 9 weight percent based on the weight of the admixture of water,
wherein the at least one reactive blowing catalyst is N,N,N'-trimethyl-N'-aminopropyl-bis(aminoethyl) ether.

8. A process for producing a flexible polyurethane foam comprising the steps of:
(1) admixing:
(I) an organic isocyanate; and
(II) an admixture of:
(a) from about 1 to about 50 weight percent based on the weight of the admixture of at least one autocatalytic polyol;
(b) from about 30 to about 95 weight percent based on the weight of the admixture of at least one ethylene oxide (EO)-capped polyol, wherein the content of the ethylene oxide present in the at least one ethylene oxide (EO)-capped polyol is from about 19 weight percent to about 30 weight percent based on the weight of the at least one ethylene oxide (EO)-capped polyol;
(c) from about 0.2 to about 2.5 weight percent based on the weight of the admixture of at least one reactive blowing catalyst;
(d) from about 0.1 to about 2.5 weight percent based on the weight of the admixture of at least one surfactant; and
(e) from about 4 to about 9 weight percent based on the weight of the admixture of water;
wherein the at least one reactive blowing catalyst is N,N,N'-trimethyl-N'-aminopropyl-bis(aminoethyl) ether; wherein a reactive foam-forming composition is formed; and
(2) subjecting the resulting reactive foam-forming composition from step (1) to conditions sufficient to cure the reactive foam composition to form a flexible polyurethane foam.

* * * * *